Nov. 20, 1962  E. W. STARNES  3,064,968
APPARATUS FOR MOVING LAYERS OF MATERIAL
FROM ONE STATION TO ANOTHER
Filed June 27, 1960  4 Sheets-Sheet 4
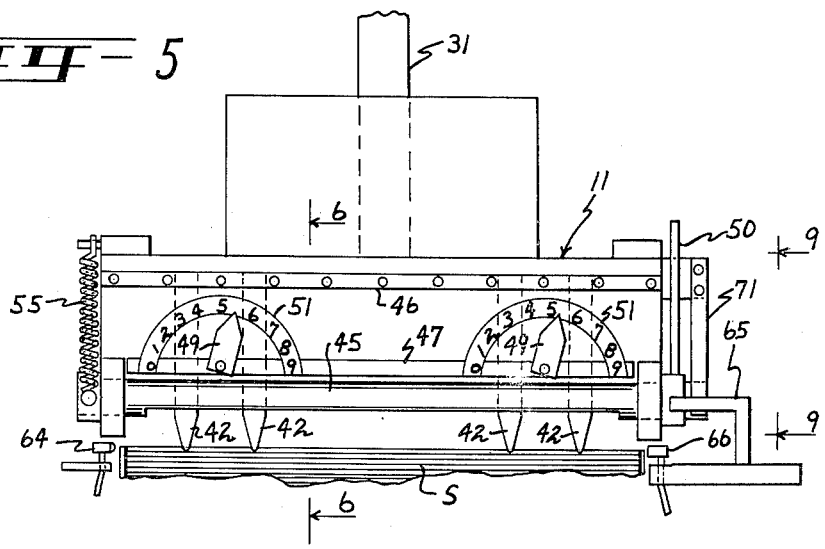
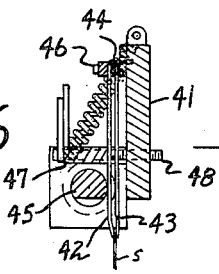 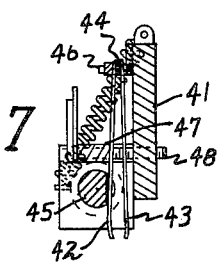
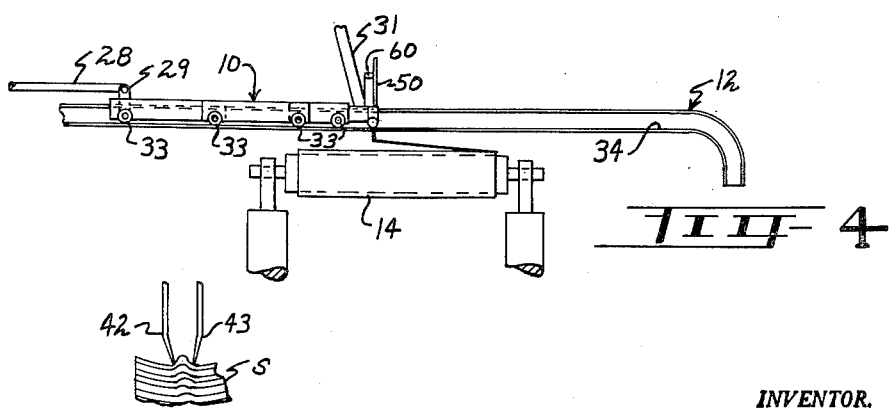
INVENTOR.
Earl W. Starnes
BY
Attorneys

United States Patent Office 3,064,968
Patented Nov. 20, 1962

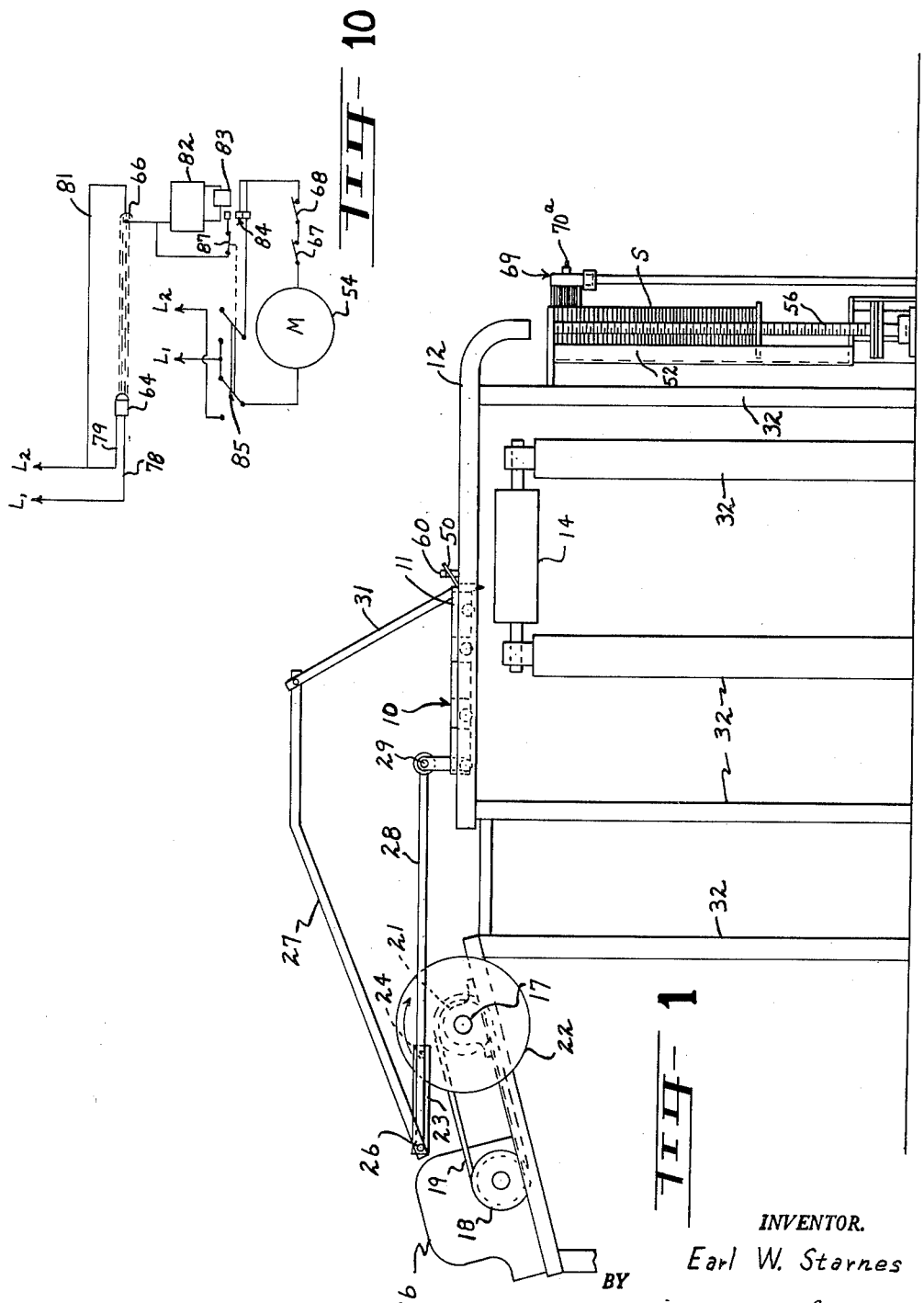

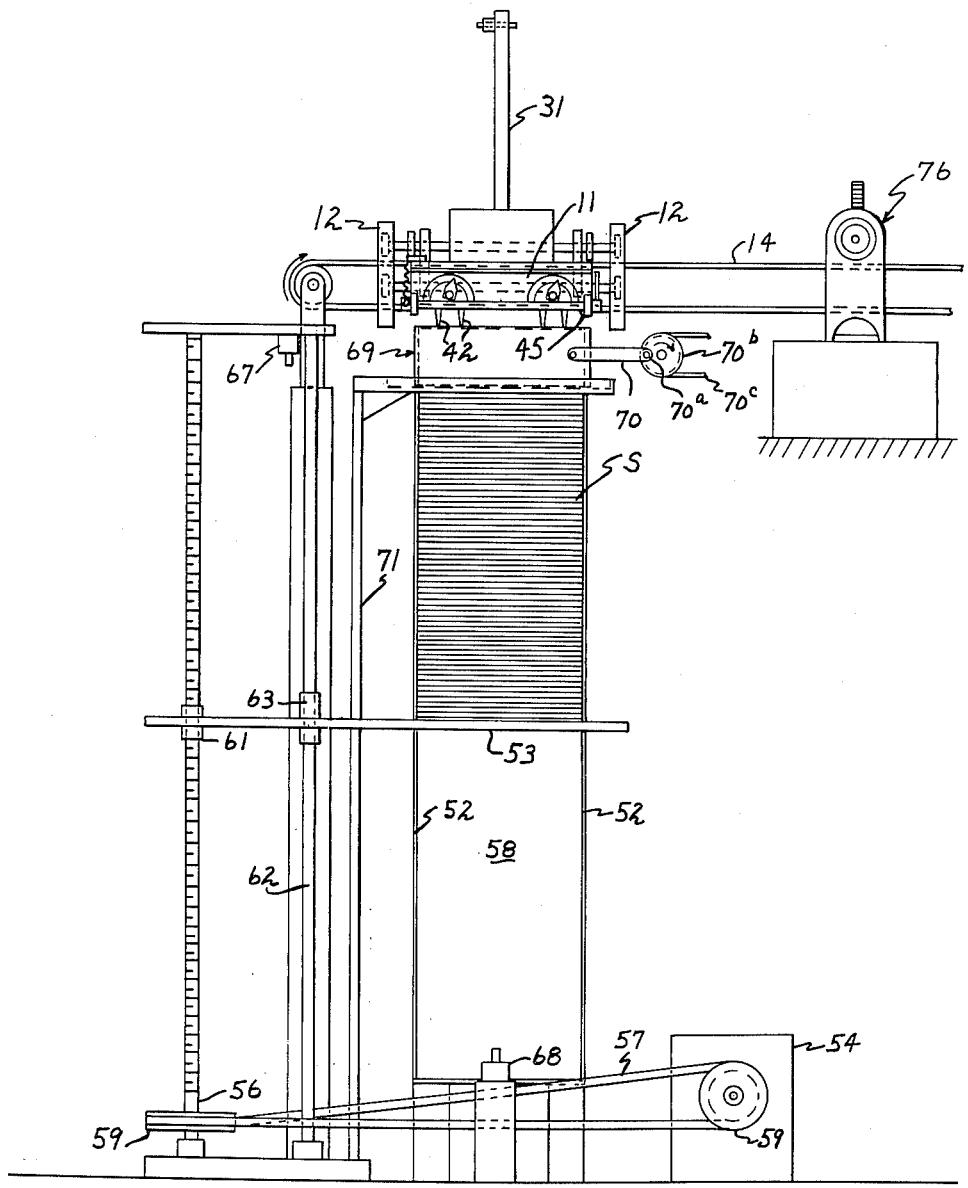

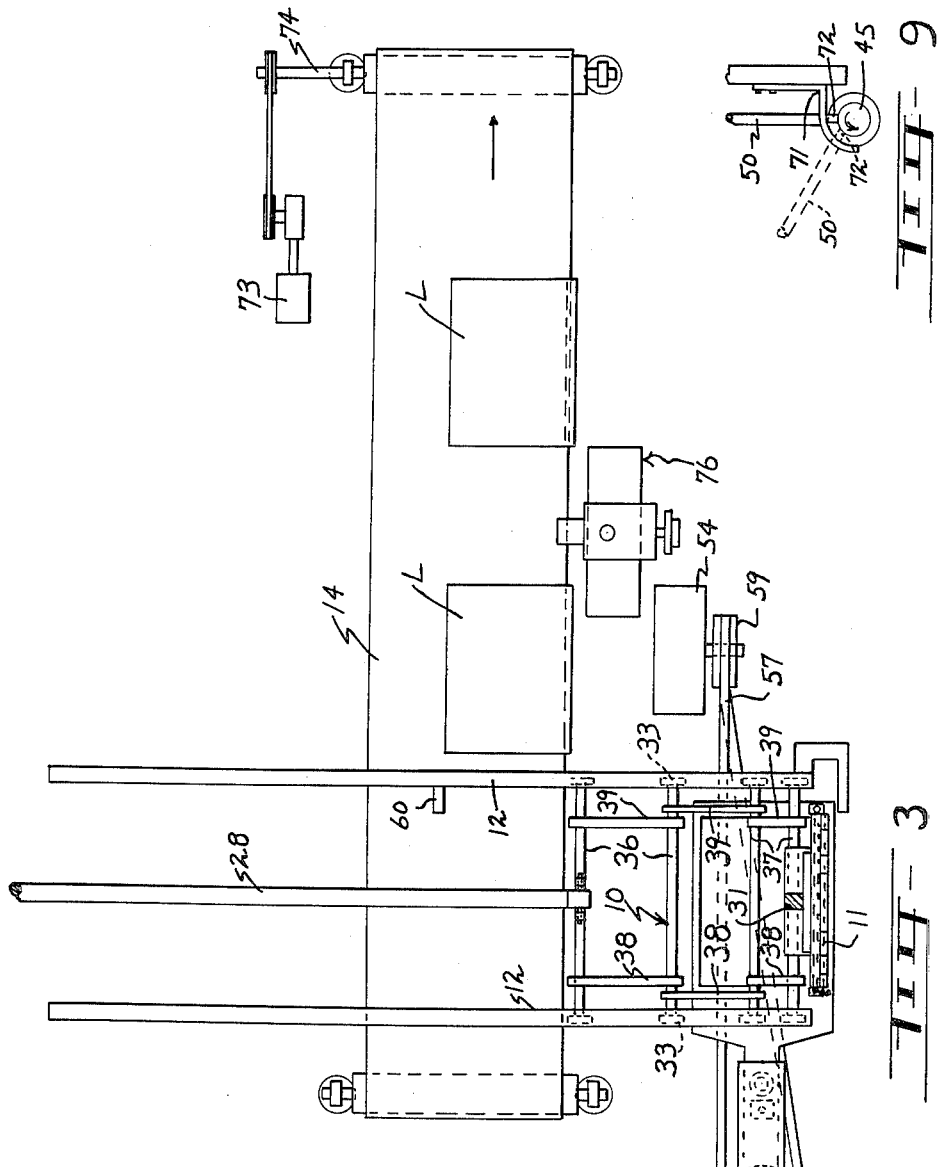

3,064,968
APPARATUS FOR MOVING LAYERS OF MATERIAL FROM ONE STATION TO ANOTHER
Earl W. Starnes, % The Russell Manufacturing Co., Alexander City, Ala.
Filed June 27, 1960, Ser. No. 39,142
3 Claims. (Cl. 271—19)

This invention relates to apparatus for moving separate thicknesses of material from one station to another and more particularly to apparatus having gripping means to grip and move at least one layer of material from one station to another.

Heretofore, when desired to transfer separate thicknesses of fabric material in a continuous manner from one station to another, such as from a stack thereof to a conveyor, the separate thicknesses have been removed by hand from the stack and placed on a conveyor or the like for delivery to subsequent apparatus, such as a sewing machine.

The present invention comprises a pick-up head movable between two stations and having a plurality of pairs of opposed gripping fingers which move while in an open position into engagement with blanks at one station. The gripping fingers close while they are in contact with at least one of the blanks and pinch or grip the top blank or blanks therebetween. Then the head is moved to the next station where the fingers are opened to release the blank held thereby.

It is an object of the present invention to provide apparatus for picking up single or multiple thicknesses of sheets such as garment part blanks from one station and carrying them to another station which apparatus has a plurality of pairs of opposed gripping fingers which are movable toward and away from each other and grip the blank or blanks.

A further object of the invention is to provide apparatus for picking up single or multiple thicknesses of fabric material from the surface of a stack of sheets which stack moves upwardly after layers of fabric material are removed thereby to maintain the outer surface of the stack at substantially the same position.

An additional object is to provide apparatus for picking up single or multiple layers of material at one station and for carrying the material to another station in which apparatus a carriage is mounted in guides for reciprocation between the stations with opposed pairs of gripping fingers on the carriage extending downwardly therefrom, means on the carriage to press the fingers together when in contact with material at one station at the end of the forward stroke to grip a layer of material, and means to open the fingers carrying the material when the carriage reaches the other station, thereby to release the material.

The material to which my invention is applicable is of a pliable nature such as cloth or the like. Therefore, as the fingers contact the pliable material and then move together, they pucker the sheets slightly between the fingers, thus to grip only the outermost sheet or sheets. The spacing of the fingers and the downward movement of the fingers after they contact the sheets vary according to the type and thickness of material with which my apparatus is employed and the number of layers desired to be picked up by my apparatus.

Apparatus embodying features of the invention is shown in the accompanying drawings, forming a part of this application, in which:

FIG. 1 is a side elevational view of my apparatus with the pick-up head in its rearward position after a layer of material has been released and with the gripping fingers in open, cocked position;

FIG. 2 is a front elevational view of the apparatus shown in FIG. 1 with the pick-up head in position for the fingers to grip the upper layer of a stack of material therebeneath;

FIG. 3 is a fragmentary, top plan view of the apparatus shown in FIGS. 1 and 2 and showing a conveyor on which the material is placed by the pick-up head for stitching by a sewing machine;

FIG. 4 is a fragmentary side elevational view of my apparatus with the pick-up head in its rearward stroke in a position immediately before releasing the layer of material onto a conveyor and with one of the guides removed;

FIG. 5 is an enlarged front elevational view of the pick-up head in position to pick up a layer of material from the upper surface of a stack and showing an electric eye for maintaining the upper surface of the stack at a fixed height;

FIG. 6 is a cross sectional view taken generally along the line 6—6 of FIG. 5 and showing the gripping fingers pressed together for gripping a layer of material therebetween;

FIG. 7 is a cross sectional view similar to FIG. 6 but showing the gripping fingers in open position;

FIG. 8 is a fragmentary, enlarged elevational view of a pair of gripping fingers contacting the upper surface of a stack of material and in position to grip the upper layer of material for removing it from the stack;

FIG. 9 is a fragmentary elevational view of an end of the carriage looking generally along the line 9—9 of FIG. 5; and, FIG. 10 is a diagrammatic view of the electrical circuit for controlling the means to move the stack of material vertically.

Referring now to the drawings for a better understanding of my invention, and more particularly to FIGS. 1–3, I show a carriage indicated generally by the numeral 10 and having a pick-up head 11 on the forward end thereof. A pair of spaced parallel side guides 12 support carriage 10 for movement. A stack of separate layers of material S such as sleeve blanks for T shirts is positioned beneath head 11.

Feed means, such as a conveyor 14, is positioned adjacent the stack of material S and beneath head 11. Head 11 reciprocates between stack S and conveyor 14 to carry single or multiple layers L from the upper surface of stack S to conveyor 14. For moving carriage 10, a motor 16 is mounted on suitable supports and drives shaft 17 through drive pulley 18, belt 19 and pulley 21. Secured to shaft 17 is a fly wheel 22. A connecting rod 23 is connected eccentrically at 24 to fly wheel 22. Pivotally mounted to connecting rod 23 at 26 are arms 27 and 28. Arm 28 is connected at 29 to the rear of carriage 10 and arm 27 is pivotally connected through lever 31 to head 11. Arm 27 and lever 31 aid in guiding and supporting pick-up head 11. Suitable supports 32 are provided for conveyor 14 and guides 12.

Carriage 10 has rollers 33 engaging guideways 34 (see FIG. 4) formed in guides 12. Cross shafts 36 and 37 extend between guides 12 and rollers 33 are mounted on each end of cross shafts 36 and 37. Arms 38 and 39 extend between shafts 36 and 37 and each of arms 38 and 39 is fixed to one of the shafts while mounted for pivotal movement relative to the other shaft to which it is connected. Thus, upon head 11 reaching the end of guides 12, head 11 moves downwardly as the arms pivot about shaft 37. Lever 31 supports head 11 as it pivots downwardly at the end of its forward stroke. Carriage 10 reciprocates between stack S and conveyor 14 while supported between guides 12.

Referring now to FIGS. 5–7, pick-up head 11 comprises a back supporting plate 41 on which are mounted a plurality of pairs of opposed gripping fingers 42 and 43. Fingers 42 and 43 are connected at their upper ends and fit around a bar 44. Bar 44 is secured to the upper portion of supporting plate 41 by a cover plate and suitable securing means indicated generally by numeral 46. Plate 47 has screws 48 passing therethrough to adjust plate 47 for movement relative to the back supporting plate 41. Mounted on the forward end of screws 48 are pointers 49. Dials 51 are secured to plate 47 and pointers 49 indicate the spacing of gripping fingers 42 and 43. To decrease the spacing of gripping fingers 42 and 43, pointers 49 may be moved clockwise as viewed in FIG. 5. A cam rod 45 having a flat surface on one side thereof is mounted for limited rotation in collars. A lever 50 is secured to one end of rod 45 and controls the movement of rod 45. Spring 55 is secured to the other end of rod 45 and urges cam rod 45 to the position shown in FIG. 6.

For actuating lever 50 and thereby to open and close fingers 42 and 43 a rear lever engaging bar 60 is provided on one of the guides 12. As shown in FIG. 1, lever 50 engages bar 60 in its rearward travel which results in the turning of cam rod 45 to the position shown in FIG. 7 thereby allowing fingers 42 and 43 to open to release the material carried by the fingers. A front lever engaging member 65 is mounted adjacent the forward end of guides 12 and as head 11 moves forwardly with the fingers open, bar 50 engages the upper end of rod 65 when head 11 reaches the end of its forward stroke and cam rod 45 is moved to the position shown in FIG. 6, thereby closing fingers 42 and 43. Lever 50 engages rod 65 at the end of the forward stroke after fingers 42 and 43 have contacted the upper surface of stack S thereby to close fingers 42 and 43.

Referring now to FIGS. 1 and 2, a hopper for supporting the stack of material S comprises a back plate 58 and partial side plates 52. A vertically movable follower 53 is mounted between plates 52 and supports the stack of sheets S thereon. Motor 54 drives a screw 56 through belt 57 and pulleys 59. Follower 53 has an internally threaded sleeve 61 engaging the screw threads on screw 56 and upon energizing of motor 54, follower 53 is moved vertically. A vertical support 62 aids in supporting follower 53 through a slidable sleeve 63 secured to the follower.

The upper surface of the stack S is maintained at the same vertical height. To accomplish this, a light source (see FIG. 5) 64 is positioned adjacent the upper surface of stack S and a photoelectric cell 66 is positioned adjacent an opposite edge of stack S. Light source 64 and photoelectric cell 66 are provided in the circuit to motor 54. When the light rays from source 64 are received by photoelectric cell 66, motor 54 is energized to move follower 53 and stack S vertically. When the rays from source 64 are obstructed by the upper portion of stack S, motor 54 is deenergized to stop the movement of follower 53.

A limit switch 67 is secured adjacent the upper end of screw 56 as a safety feature to stop the upward movement of follower 53. A lower limit switch 68 is provided under follower 53 and stops the downward movement of follower 53 when it contacts limit switch 68.

Mounted adjacent the forward side of the stack S is a brush 69. Secured to one end of the brush is a lever 70. The lever 70 is connected in eccentric manner as at 70$^a$ to a disk 70$^b$. The disc 70$^b$ is driven by a belt 70$^c$ from any suitable part of the apparatus. Thus, as the brush reciprocates, its bristles enter between the layers of fabric of stack S. As the fingers pick up a layer or layers, the bristles serve to separate the layer or layers being removed from the immediately subjacent layer. This assures the removal of the number of layers for which the pick-up mechanism is set. The strength of the bristles is just sufficient to provide slight hold-down action on the under layer while being insufficient to interfere with the pick-up of the superjacent layers.

While the conveyor 14 has been shown as the station to which the layers of material L are placed for movement to other apparatus, other stations may be employed. Conveyor 14 is driven by motor 73 through shaft 74 operatively connected thereto through suitable connecting means. A sewing machine is indicated generally by the numeral 76 and stitches the edge of the layers of material L.

Referring now to FIG. 8, gripping fingers 42 and 43 are shown immediately before gripping a layer of material. The type of material determines the width or distance between the gripping fingers 42 and 43 and also the downward movement of fingers 42 and 43. On cotton knit material of double thickness, fingers 42 and 43 move downwardly after contacting the upper surface of the stack a distance approximately ¾ inch. The fingers are spaced approximately ⅛ of an inch apart. When the fingers move downwardly after contacting the upper surface of the stack, the portion between the fingers bulges and when the fingers close, the bulged portion therebetween is caught or gripped by the fingers.

My apparatus operates efficiently at a speed of around 30 r.p.m. and it is believed that considerably higher speeds may be obtained. While the material is of a pliable nature, the spacing of the fingers and the downward pressure exerted by the fingers on the upper surface of the stack will vary. As the thickness of the material increases, the downward movement of the fingers will increase and likewise the spacing of the fingers will increase. Likewise, by suitably adjusting the stroke of the head 11 and the spacing of the fingers, multiple layers may be removed with each pick-up operation.

Referring to FIG. 9, means to hold the fingers 42 and 43 in cocked open position is shown and comprises an angle arm 71 which is spaced from a reduced diameter end of cam rod 45. A button or protuberance 72 extends from the reduced end and when cam rod 45 is rotated so that fingers 42 and 43 are open, button 72 engages the surface of arm 71 and presses arm 71 outwardly slightly whereby cam rod 45 is retained in such position by the bias of arm 71 against button 72. The dotted line positions of lever 50 and button 72 show their positions when fingers 42 and 43 are open.

Referring now to FIG. 10, a partial diagrammatic view of the electrical circuit for controlling motor 54 is shown. Power lines $L^1$ and $L^2$ are connected to light source 64 through lines 78 and 79. Photoelectric cell 66 is connected to line $L^2$ through line 81 and an amplifier 82 is connected to cell 66. The amplifier is in circuit with a relay 83 controlling switch 84. One contact of switch 84 is connected to $L^2$ and the other is connected to motor 54. A manual double throw reversing switch 85 is shown diagrammatically and when actuated motor 54 is reversed and switch 87 is opened whereby follower 53 is lowered. Switch 87 is operatively connected to switch 85 for actuation when switch 85 is actuated. Limit switches 67 and 68 are provided in the circuit to motor 54.

In operation, carriage 10 is moved from its rearward position with fingers 42 and 43 opened by energizing motor 16. Head 11 pivots downwardly about shaft 37 when it reaches the end of its forward stroke as rollers 33 follow guideways 34 in guides 12. As head 11 pivots downwardly, fingers 42 and 43 engage the upper surface of the stack and press downwardly, in some cases adjacent the edge of the stack, to create a bulging portion or pucker between the fingers as shown in FIG. 8. Lever 50 then engages rod 65 and the bias of spring 55 moves cam rod 45 to the position in FIG. 6 thereby closing fingers 42 and 43 to grip a piece of material L therebetween. Carriage 10 then begins its rearward stroke with fingers 42 and 43 gripping the upper layer of material from stack S. Upon removal of the upper layer of material, rays from light source 64 contact photoelectric cell 66 to complete the circuit to motor 54. The energizing of motor 54 turns screw 56 and raises follower 53 until the rays of light to photoelectric cell 66 are cut off by stack S. When this occurs, motor 54 is deenergized and the movement of stack S ceases. Carriage 10 moves on its rearward stroke over conveyor 14 with fingers 42 and 43 gripping the layer of material therein. As head 11 reaches a predetermined position over the conveyor, lever 50 engages actuating bar 60 and is moved downwardly to rotate cam bar 45 to open fingers 42 and 43 thereby releasing the layer of material L on conveyor 14. A new cycle is then ready to commence.

From the foregoing, it will be understood that I have provided apparatus to transfer individual layers of material, such as fabric, from one station to another station, such as from a vertical stack to feed means. My apparatus comprises a plurality of gripping fingers that engage a layer or layers of material therebetween and then transfer it to feed means, such as a conveyor. The upper surface of the stack of material S remains at a fixed height and automatically raises to keep the top of the stack in reach of the pick-up mechanism. This preferably is accomplished through an electric eye positioned adjacent the upper surface of the stack. The spacing between the fingers 42 and 43 may be varied as well as the downward movement of the fingers after they first contact the upper surface of the stack. The type and thickness of material determines the spacing of fingers 42 and 43 as well as their downward movement. For picking up multiple layers, it is only necessary to adjust the apparatus as has been indicated. Also, it will be apparent that my improved apparatus may be used to build a stack of layers by placing it at a station to which the layers are delivered. For instance, it is possible to place the apparatus at the delivery end of the feed belt 14, and to take off the layers as they arrive at the end of the belt and place them in a stack.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In apparatus to pick up the upper layer of a vertical stack of pliable material, a pair of side guides having a generally horizontally extending portion and a downwardly extending generally vertical portion at the forward end thereof adapted to be positioned over the upper layer of the stack, a carriage mounted for movement in the side guides, said carriage comprising a pick-up head mounted adjacent the forward end thereof, a linkage on the carriage connected to the pick-up head to allow the head to move downwardly in the downwardly extending portion of the guides to engage the upper layer of the stack while a portion of the carriage remains in the generally horizontally extending portions of the guides, means operatively connected to the carriage to reciprocate the carriage in the guides between forward and rearward positions, said pick-up head having a plurality of transversely aligned pairs of gripping members extending downwardly therefrom to engage the upper surface of the stack when the pick-up head moves downward, each of the gripping members having a fixed finger and an opposed movable finger, means to press the fingers together when in contact with the upper surface of the stack at the end of the forward stroke thereby to grip a layer of pliable material, and additional means to open the fingers when the carriage reaches a predetermined rearward position after the pliable material has been picked from the stack.

2. In apparatus to pick up the upper layer of a vertical stack of pliable material, a pair of side guides having a generally horizontally extending portion and a downwardly extending generally vertical portion at the forward end thereof adapted to be positioned over the upper layer of the stack, a carriage mounted for movement in the side guides, said carriage comprising a pick-up head mounted on the forward end thereof, a linkage on the carriage connected to the pick-up head to allow the head to move downwardly in the downwardly extending portion of the guides while a portion of the carriage remains in the generally horizontally extending portions of the guides, means operatively connected to the carriage to reciprocate the carriage in the guides between forward and rearward positions, said pick-up head having a plurality of transversely aligned pairs of gripping member extending downwardly therefrom to engage the upper surface of the stack when the pick-up head moves downwardly, each of the gripping members having a fixed finger and an opposed movable finger, a rotatable cam rod on the pick-up head in contact with the movable fingers for moving the fingers between open and closed positions upon rotation thereof, means on the apparatus to rotate the cam rod to close the fingers when in contact with the upper surface of the stack at the end of the forward stroke thereby to grip a layer of pliable material, additional means on the apparatus to open the fingers when the carriage reaches a predetermined distance on its rearward stroke thereby to release the layer of material held thereby, a vertically extending hopper in which the stack of material is placed, a vertically movable follower beneath the stack, and means to move the follower upwardly upon the removal of each layer of material whereby the upper surface of the stack remains at substantially constant height.

3. In apparatus to pick up the upper layer of a stack of pliable material, a pair of side guides having a generally horizontally extending portion and a downwardly extending portion at one end thereof adapted to be positioned over the upper layer of the stack, a carriage mounted in the side guides for movement, said carriage comprising a pair of spaced shafts extending between the guides and a pick-up head fixed on the forward shaft for movement therewith, a pair of arms extending between the shafts and allowing the forward shaft to move downwardly in the downwardly extending portion of the guides while the rearward shaft remains in the horizontally extending position of the guides, means operatively connected to the rearward shaft to reciprocate the head in the guides through said shaft, a support lever connected to the pick-up head to aid in guiding and supporting the pick-up head in the side guides, said pick-up head moving downwardly with said forward shaft when it reaches the downwardly extending portion of the guides and being supported by said lever, said pick-up head having a plurality of transversely aligned pairs of gripping fingers extending downwardly therefrom to engage the upper surface of the stack, each of the pairs of gripping fingers having a fixed finger and an opposed movable finger, a rotatable cam rod on the pick-up head in contact with the movable fingers and moving the fingers between open and closed positions upon rotation thereof, means on the apparatus to rotate the cam rod to press the fingers together when in contact with the upper surface of the stack at the end of the forward stroke thereby to grip a layer of pliable material, and additional means on the apparatus to open the fingers when the carriage reaches a predetermined distance on its rearward stroke thereby to release the layer of material held thereby.

References Cited in the file of this patent

UNITED STATES PATENTS

| | | |
|---|---|---|
| 503,063 | Orser | Aug. 8, 1893 |
| 1,378,886 | Maineri | May 24, 1921 |
| 1,579,468 | Cooper | Apr. 6, 1926 |
| 2,525,311 | Peyrebrune | Oct. 10, 1950 |
| 2,653,679 | Hamilton | Sept. 29, 1953 |